US011927525B2

(12) United States Patent
Villa-Aleman et al.

(10) Patent No.: US 11,927,525 B2
(45) Date of Patent: Mar. 12, 2024

(54) DOUBLE-WALLED CONTAINMENT CELL

(71) Applicant: BATTELLE SAVANNAH RIVER ALLIANCE, LLC, Aiken, SC (US)

(72) Inventors: Eliel Villa-Aleman, Aiken, SC (US); Michael C. Maxwell, Evans, GA (US); Don D. Dick, Jr., North Augusta, SC (US)

(73) Assignee: Battelle Savannah River Alliance, LLC, Aiken, SC (US)

( * ) Notice: Subject to any disclaimer, the term of this patent is extended or adjusted under 35 U.S.C. 154(b) by 31 days.

(21) Appl. No.: 17/523,333

(22) Filed: Nov. 10, 2021

(65) Prior Publication Data

US 2023/0146527 A1     May 11, 2023

(51) Int. Cl.
    *G01N 21/03*     (2006.01)
    *G01J 3/44*     (2006.01)
    *G01N 21/01*     (2006.01)

(52) U.S. Cl.
    CPC .............. *G01N 21/01* (2013.01); *G01J 3/44* (2013.01); *G01N 21/03* (2013.01)

(58) Field of Classification Search
    CPC ........ G01N 21/01; G01N 21/03; G01N 21/65; G01N 21/64; B01L 3/5082; B01L 9/06; B01L 2200/141; B01L 2300/042; B01L 2300/0854; B01L 2200/142; G01J 3/44; G01J 3/26
See application file for complete search history.

(56) References Cited

U.S. PATENT DOCUMENTS

| | | | | |
|---|---|---|---|---|
| 6,486,947 | B2 * | 11/2002 | Modlin ............... | B01L 3/50853 356/244 |
| 7,166,800 | B2 * | 1/2007 | Shaw ..................... | F16J 15/061 220/254.2 |
| 7,545,490 | B1 * | 6/2009 | Pendell-Jones ........ | G01N 21/85 356/244 |

(Continued)

FOREIGN PATENT DOCUMENTS

| | | |
|---|---|---|
| CN | 101958156 | 1/2013 |
| CN | 106596671 | 12/2018 |
| GB | 970104 | 9/1964 |

OTHER PUBLICATIONS

Colle, et al. "A Novel Technique for Raman Analysis of Highly Radioactive Samples Using Any Standard Micro-Raman Spectrometer" *J. Visual. Exp.* 122:e54889 (2017) pp. 1-12.

(Continued)

*Primary Examiner* — Abdullahi Nur
(74) *Attorney, Agent, or Firm* — Dority & Manning, P.A.

(57) ABSTRACT

Double-walled containment cells are described as may be used for storage, transport, and examination of a sample held within the cell by use of optical analysis techniques. A double-walled containment cell can include multiple types of windows that can be located as desired on the containment cells and thereby provide for optical access to a sample for multiple optical analysis techniques. Disclosed containment cells can be sized and designed for use with existing optical analysis systems, e.g., laser ablation, X-ray diffraction, spectral analysis (e.g., Raman spectroscopy, infrared spectroscopy, laser-induced breakdown spectroscopy, etc.), imaging analysis, etc.

20 Claims, 7 Drawing Sheets

(56) References Cited

U.S. PATENT DOCUMENTS

| | | | |
|---|---|---|---|
| 7,780,248 B2* | 8/2010 | Granadino | G01M 3/226 73/40.5 R |
| 7,981,055 B2* | 7/2011 | Freeman | A61B 5/150358 600/583 |
| 8,146,769 B2* | 4/2012 | Hogan | B65D 50/041 220/730 |
| 9,041,920 B2* | 5/2015 | Mander | G01N 21/01 356/51 |
| 9,366,736 B2* | 6/2016 | Cho | G01R 33/307 |
| 2015/0206611 A1* | 7/2015 | Moulin | G21G 1/08 376/202 |
| 2020/0299048 A1* | 9/2020 | Santamaria | B65D 77/003 |

OTHER PUBLICATIONS

Dunn, H.W. "X-ray Diffraction Sample Holder for Radioactive Samples or Samples that React with Air or Light" *Oak Ridge Nat'l. Lab.* CONF-780522-8 (1978) pp. 1-4.

Naji, et al. "An original approach for Raman spectroscopy analysis of radioactive materials and its application to americium-containing samples" *J. Raman Spectro.* (2015) pp. 1-7.

Villa-Aleman, et al. "Raman microspectroscopy of $PuO_2$ particulate aggregates" *J. Nucl. Mater.* 515 (2019) pp. 140-149.

\* cited by examiner

DOUBLE-WALLED CONTAINMENT CELL

FEDERAL RESEARCH STATEMENT

This invention was made with Government support under Grant No. DE-AC09-08SR22470, awarded by the U.S. Department of Energy. The Government has certain rights in the invention.

BACKGROUND

A variety of advanced optical analysis techniques has been developed that can utilize probing wavelengths across a broad range of the electromagnetic spectrum, e.g., X-ray diffraction, laser ablation spectroscopy, infrared spectroscopy, transmission spectroscopy, Raman spectroscopy, etc. Such analysis techniques can provide useful insights into the nature of a sample, particularly when the sample is analyzed by use of multiple different techniques. Unfortunately, the instrumentation required for each technique is expensive and difficult to maintain, and as such, it is often not possible to obtain broad spectrum analysis of a single sample.

This is particularly problematic when considering examination of hazardous materials, such as radioactive or biohazard samples, as these materials must be safely contained to prevent contamination. One solution for examining a potentially hazardous sample is to locate the analysis instrumentation in the containment area. This is generally not a pragmatic answer, however, due to possible instrument contamination, as well as complicated instrument repair and calibration procedures given the containment environment. Moreover, limiting analysis to only those techniques for which the instrumentation is isolated in a containment field will severely limit the number of different analyses that can be carried out.

A more practical solution is to safely contain the sample in an optically accessible cell and examine the sample using external instrumentation while the sample is isolated in containment. Containment cells have been developed, but they often rely on a strip of tape over the cell closure to (hopefully) provide an adequate seal; they tend to be bulky and not easily transported, and generally allow for only a single type of analysis to be performed on the retained sample.

What is needed in the art is a containment cell that can safely seal a sample within a double-walled sample chamber. A self-sealing containment cell that can be easily assembled in a glove box or other containment area, allows for safe and facile transport, and that is capable of use with a variety of optical characterization techniques that can be carried out away from the original sample environment, such as in a clean room, would be of great benefit to the art.

SUMMARY

According to one embodiment, disclosed is a double-walled containment cell that includes an inner cell and an outer cell. The inner cell includes an inner cell base and an inner cell cap and the outer cell includes an outer cell base and an outer cell cap. All of these components of a containment cell can be removably attachable to one another to provide for assembly and disassembly of the containment cell.

The inner cell base can include a sample holder and an outer surface. The inner cell cap includes an inner surface that is configured to mate with the outer surface of the inner cell base (e.g., via threading of the two). The inner cell cap also includes a window that is transmissive to an electromagnetic wavelength and that, upon assembly, is optically aligned with the sample holder. The inner cell can also define at least one sample chamber, for instance, within the inner cell base, within the inner cell cap, or spaced between the two.

The outer cell base includes an inner surface that is configured to mate with a portion of the outer surface of the inner cell cap. In addition, the outer cell base includes first and second outer surfaces that define a lip or edge of the base. The outer cell cap includes first and second inner surfaces that are configured to mate with the first and second outer surfaces of the outer cell base. For instance, two of these mating surfaces can be threaded to tightly mate the outer cell cap to the outer cell base. The outer cell cap also includes a window that upon assembly of the cell is optically aligned with the window of the inner cell cap and with the sample holder.

A double-walled containment cell can also include an alignment joint (e.g., a recess and tab that mate with a particular orientation) that is configured to align the inner cell base with the outer cell base.

A double-walled containment cell can optionally include a base plate. A base plate can include an alignment joint that can mate with both the inner cell base and the outer cell base and can be used to facilitate assembly of a cell.

A double-walled containment cell can also include an orientation mechanism on an outer surface of the outer cell that can be used to align the cell following assembly, for instance, with an optical examination system or to identify the alignment of a sample held within the cell. Upon assembly of the inner and outer cells, a sample chamber therein can be sealed from the surrounding environment with a gas- and liquid-tight seal. Moreover, the double-walled containment cell can block emission of alpha radiation from a sample held in the sample chamber.

A double-walled containment cell can include one or more sample chambers of various sizes. Moreover, a double-walled containment cell can include multiple windows to provide access to the sample chamber for different types and/or orientations of optical analysis.

Also disclosed are methods for examining a sample by use of a double-walled containment cell. For instance, a method can include locating a sample on a sample holder of an inner cell base. A method can also include assembling the double-walled containment cell to seal the sample within the sample chamber. The assembly can include attaching an inner cell cap to the inner cell base to assemble the inner cell, locating the inner cell within an outer cell base, and attaching an outer cell cap to the outer cell base to assemble the double-walled containment cell and sealing the sample within the sample chamber. Methods can also include examining the sample that is sealed in the cell by one or more optical analysis techniques. Methods can also include storing and/or transporting the sample, as well as examining the sample again at a later time following the initial examination.

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying figures in which.

Figure 1:
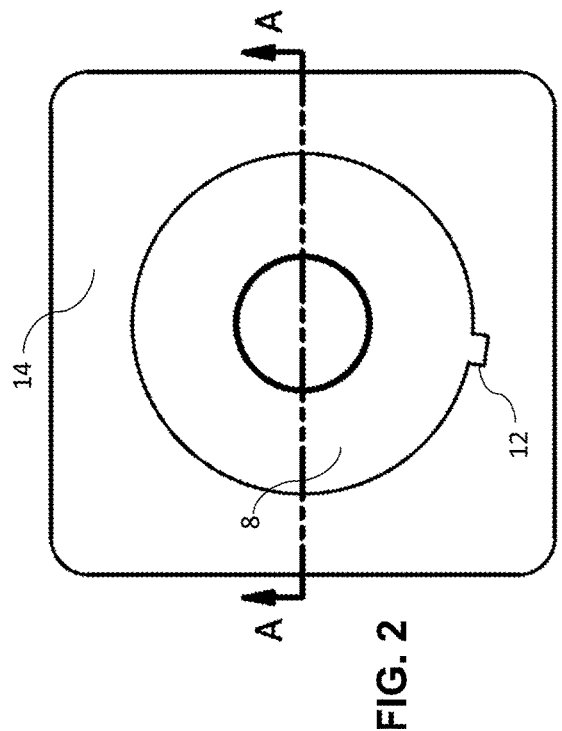
FIG. 1 illustrates components of a disassembled double-walled containment cell.

Repeat use of reference characters in the present specification and drawings is intended to represent the same or analogous features or elements of the present invention.

DETAILED DESCRIPTION

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment, may be used in another embodiment to yield a still further embodiment.

The present disclosure is directed to double-walled containment cells that can be utilized to safely store, transport, and examine a sample held within the cell by use of optical analysis techniques. Beneficially, a double-walled containment cell can include any number and type of windows that can be located as desired on the containment cells and thereby provide for optical access to a sample for any number of optical analysis techniques. In addition, disclosed cells can have an overall size and can include sample chambers that are sized and oriented with optically aligned windows so as to conform to existing analysis instruments. For instance, disclosed containment cells can be sized for use with existing examination devices, e.g., infrared microscopy systems or other optical examination devices that may have a limited sample location area size and/or require a particular sample working distance for accurate analysis. The number and locations of the windows relative to a sample chamber within the cell can also be designed for facile use with existing optical analysis systems, e.g., laser ablation, X-ray diffraction, spectral analysis (e.g., Raman spectroscopy, infrared spectroscopy, laser-induced breakdown spectroscopy, etc.), imaging analysis, etc.

Disclosed containment cells can be assembled quickly and easily without the need of any assembly tools, even when assembled within a constrained area, such as a glove box. Upon assembly, a sample held within a sample chamber of a containment cell can be safely isolated from the surrounding environment as upon assembly of the various components, the sample chamber can be self-sealing and prevent passage of liquid or gas. As such, no further taping or wrapping of the containment cell is necessary to ensure safe enclosure of a sample following assembly. The containment cells can also be formed of materials that block alpha radiation, and as such, can be utilized for storage/transport/analysis of radioactive materials as well as other types of hazardous materials.

The versatility of disclosed double-walled containment cells can encompass wide design choice with regard to size, shape, materials, etc., so as to allow additional, non-optical analysis techniques to be carried out, if desired. For instance, samples retained within a double-walled containment cell can be, e.g., controllably heated for thermal analysis and/or can be subjected to micro conductivity examination or other techniques in addition to optical analysis techniques.

A double-walled containment cell can include an inner cell and an outer cell, and the inner and outer cell can both include a base and a cap. All of the components are removably attachable to one another to provide for assembly, during which a sample can be sealed within the sample chamber, as well as to provide for disassembly to allow for disposal of a sample and, if desired, re-use of the cell.

FIG. 1 illustrates one embodiment of components of a double-walled containment cell including an inner cell base 2, an inner cell cap 4, and outer cell base 6, and an outer cell cap 8. As shown, the components can generally be circular in cross-section, which can facilitate assembly, though other cross-sectional shapes of the cells can alternatively be utilized.

The inner cell caps and bases can generally be molded of a material that will be inert to samples to be retained within the cells and non-interfering with analysis techniques. For instance, the main body of the cell caps and bases of a double-walled containment cell can be molded from a suitable polymeric composition, e.g., polyethylenes, polyimides, polyesters, or the like, as well as copolymers and blends of polymers, optionally combined with fillers as are generally known in the art. By way of example, the inner and outer cell caps and bases can be formed from copolyesters, copolyester/carbonate resin blends, polycarbonates, etc. as are known in the art according to formation processes such as extrusion blow molding, etc. that can provide for high tolerance part formations.

Figure 2:
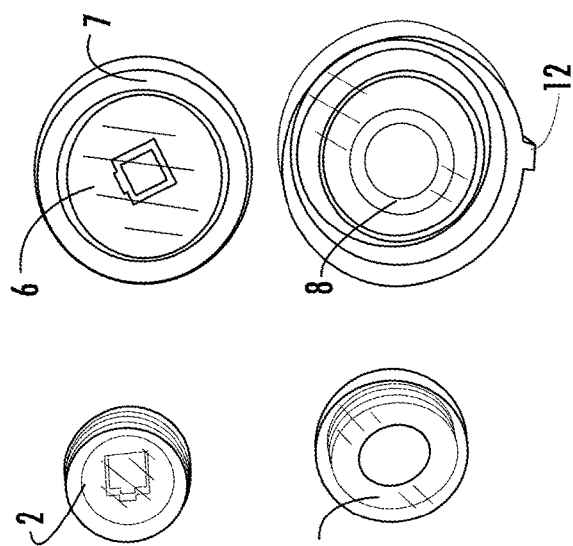
FIG. 2 presents a top view of an assembled double-walled containment cell.

As shown in FIG. 1 and FIG. 2, in some embodiments, the outer cell, e.g., the outer cell cap 8, can include an orientation mechanism 12. An orientation mechanism can be simply an extension from the outer cell cap, as shown, or can be a separate piece that can be attached to the cap 8. In any case, an orientation mechanism 12 can be useful for identifying the orientation of the cell and the sample retained therein over time. For instance, if a cell is transported and/or stored following assembly, the orientation mechanism can be utilized for identification of a particular alignment of the sample held therein. This can allow for consistent examination of the sample over time as well as other benefits.

An orientation mechanism 12 can also be utilized to properly align the containment cell and the sample held therein with an analysis device. For instance, an orientation mechanism 12 can have a particular geometry to mate with an examination platform of an analysis system, and as such, can be used to lock the cell into the system and ensure proper alignment between a sample held in the sample chamber and the analysis system.

In some embodiments, a double-walled containment cell can also include a base plate 14. Base plate 14 can be formed of the same or different materials as the inner and outer cells and can be utilized to facilitate assembly of a device, as will be explained further herein.

Figure 3:
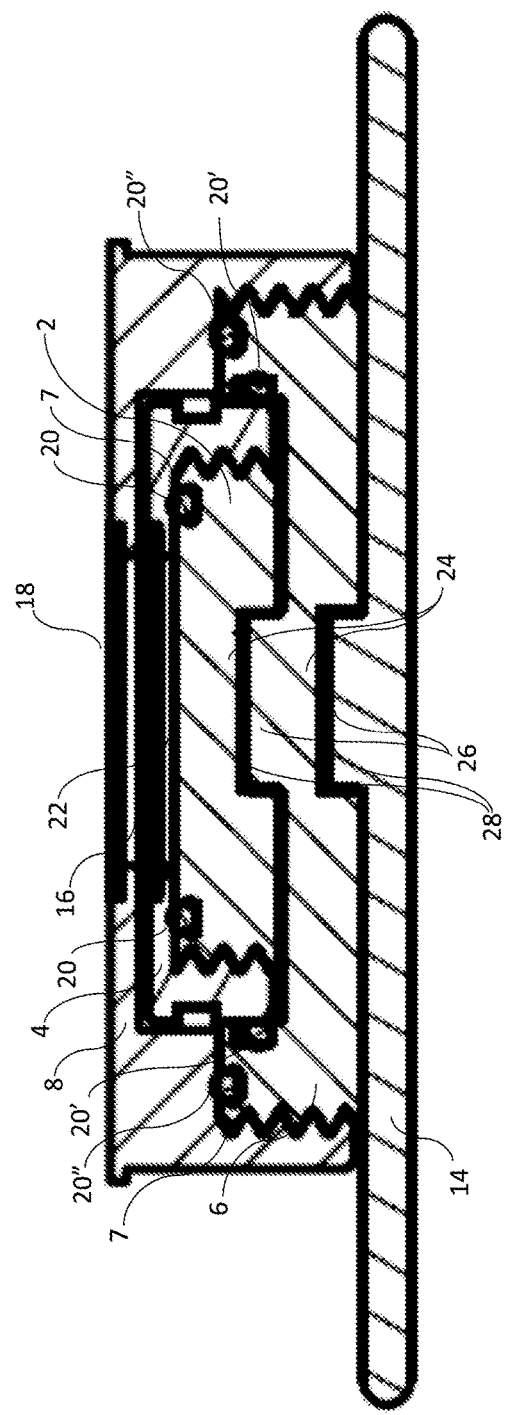
FIG. 3 presents a sectional view of the double-walled containment cell of FIG. 2 along the A-A section line.

FIG. 3 illustrates a sectional view of a double-walled containment cell following assembly along the section line A-A of FIG. 2. As shown, the inner cell base 2 and the inner cell cap 4 can be attached to one another at a mated surface. For instance, the inner cell base 2 and cap 4 can be attached by use of threads, as shown, formed into an outer surface of the inner cell base 2 and an inner surface of the inner cell cap 4. The mated attachment between the inner cell base 2 and the inner cell cap 4 need not necessarily be a threaded mating, however, and any other mated attachment mechanisms, such as a snap lock or other locking/sealing mechanisms, can be utilized to attach the base 2 to the cap 4 of the inner cell.

The inner cell cap 4 can be sized to nest within the outer cell base 6. For instance, the outer cell base 6 can define a lip or edge 7 that is sized to hold the inner cell, and in particular, to mate with and retain the cap 4 of the inner cell within the lip 7. The upper and outer surfaces of this lip 7 can mate with surfaces of the outer cell cap 8 upon assembly, as shown in FIG. 3. To tightly attach the outer cell cap 8 to the outer cell base 6, a containment cell can include a mated attachment, such as a threaded attachment as shown in FIG. 3 between the outer cell base 6 and the outer cell cap 8. Thus, the four components, including the inner cell base 2, the inner cell cap 4, the outer cell base 6, and the outer cell cap 8, can be secured together in a nested arrangement.

A system can include one or more O-rings 20 between the various components to ensure tight sealing of the system. By way of example, in the embodiment illustrated in FIG. 3, the system includes a first O-ring 20 between the inner cell base 2 and the inner cell cap 4, a second O-ring 20' between the inner cell cap 4 and the outer cell base 6, and a third O-ring 20'' between the outer cell base 6 and the outer cell cap 8. More or fewer O-rings can be included depending upon, e.g., the method of mating between the bases and the caps of the cells, the tightness of fit between the nested components, the type of samples to be contained within the sample chamber 22, etc.

O-rings can be formed of any suitable material as is generally known in the art, with preferred materials generally depending upon the expected use and sample types to be contained within a cell. O-ring materials can generally include rubbers and elastomers such as, and without limitation to, butadiene rubber, butyl rubber, chlorosulfonated polyethylene, epichlorohydrin rubber, ethylene propylene diene monomer, ethylene propylene rubber, fluroelastomer, nitrile rubber, perfluoroelastomer, polyacrylate rubber, polychloroprene (neoprene), polyisoprene, polysulfide rubber, PTFE, FEPM, silicon rubber, thermoplastic elastomers, thermoplastic polyolefins (LDPE, HDPE, LLDPE, ULDPE), thermoplastic polyurethanes, thermoplastic polyamides, etc.

The double-walled containment cell can also include windows 16, 18 in the inner and outer cells that are optically aligned with one another as well as with a sample chamber 22 of the cell. As shown in the embodiment of FIG. 3, a cell can include a window 16 providing optical access through the inner cell cap 4 and a window 18 providing optical access through the outer cell cap 8. A single optical access to a sample chamber 22 through the inner and outer cells can be used in those embodiments in which a double-walled containment cell is intended for analysis according to a back-scatter configuration. Other embodiments, discussed further herein, can include additional windows in a containment cell as may be utilized for, e.g., a transmission-based optical analysis.

Windows 16, 18 of a cell can be transparent to energy intended for use in a desired analysis technique. For instance, in those embodiments in which a double-walled containment cell is intended for use in an IR or near IR spectra analysis, the windows 16, 18 can be transparent to at least those expected wavelengths. In one such embodiment, zinc selenide (ZnSe) can be utilized, as it is known for low absorptivity at infrared wavelengths and high transmission in the visible spectrum. Other materials known for formation of IR transparent windows and the like can alternatively be utilized including, without limitation, zinc sulfide (ZnS), germanium (Ge), and gallium arsenide (GaAs).

In those embodiments in which an analysis technique can utilize X-rays, aligned windows 16, 18 can be formed of a material that is suitably transmissive to X-rays, such as a suitable polymer, e.g., polypropylene, polyethylene terephthalate (PET, biaxially oriented PET), polyethylene naphthalate (PEN), etc. X-ray transmissive windows can, in some embodiments, be formed of beryllium foil that is typically made by rolling.

Optical glasses, e.g., optical crown glasses, borosilicate glasses, and the like, can be useful materials for those embodiments in which the optical analysis technique is expected to encompass the visible or near IR spectrum (e.g., from about 320 nm to about 2500 nm).

For higher energy techniques, such as those encompassing ultraviolet energy, quartz windows may be preferred. Sapphire and/or barium fluoride are often utilized for techniques that include lasers, e.g., laser ablation of a sample, either alone as the bulk material of the window or as a coating on a quartz window.

Examples of transparent materials as may be utilized in forming windows of a double-walled containment cell can include, without limitation, ammonium di-hydrogen phosphate, potassium di-hydrogen phosphate, borosilicate glass, quartz, fused silica, gallium phosphide, calcium aluminate glass, calcite, rutile, sapphire, strontium titanate, lead sulfide, magnesium fluoride, lithium fluoride, calcium fluoride, barium fluoride, arsenic trisulfide glass, indium phosphate, gallium arsenic, silicon, sodium fluoride, cadmium sulfide, cadmium telluride, selenium, germanium, sodium chloride, silver chloride, potassium chloride, potassium bromide, diamond, and combinations thereof.

The windows 16, 18 can be constructed of material that is rigid, inert to the sample being analyzed and to the analysis environment, and transparent in the spectral region of interest. Coatings may be employed on either or both faces of windows 16, 18 to enhance chemical inertness and/or to reduce reflection at either surface of the window 16, 18 (i.e., internal or external surfaces of a window).

The windows 16, 18 may be retained in position on the inner and outer cell caps 4, 8 by mechanical seal elements, adhesive bonding media, soldering, or other bonding or securement techniques and materials as would be evident to one of skill in the art. For instance, an adhesive such as a silicone adhesive can be utilized to securely seal a window to the material (e.g., a polycarbonate resin) that forms the surrounding body of the double-walled containment component that carries the window.

A double-walled containment cell can also include one or more alignment joints 28 that can be utilized to properly align the various components of the cell and facilitate assembly of a cell. An alignment joint 28 can generally include an extension 26 and a mated recess 24 that fit together with a particular orientation, as in a mortise and tenon joint, to properly align the two mated components.

Figure 5:
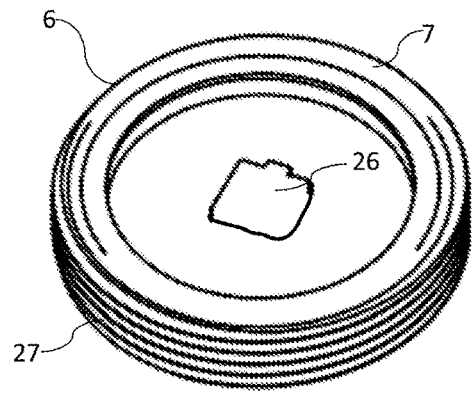
FIG. 5 presents a perspective view of an outer cell base of a double-walled containment cell.

FIG. 5 presents a perspective view of an outer cell base 6 including a view of an alignment joint extension 26 that, upon assembly, can mate with a recess in the bottom of an inner cell base 2 to ensure proper orientation between the two. The outer cell base 6 of FIG. 5 also includes threads on an outer surface 27 for attachment to an outer cell cap 8 and a lip 7 that can nest with an inner cell base 6 and outer cell cap 8, as illustrated in FIG. 3.

Figure 4:
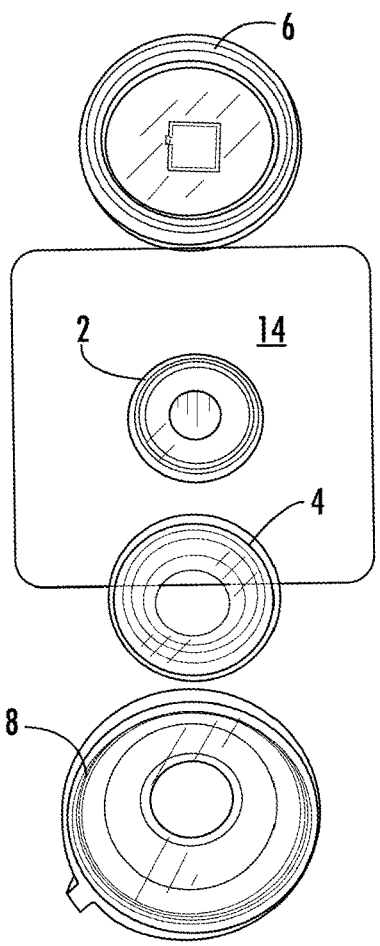
FIG. 4 illustrates another disassembled double-walled containment cell.

In the embodiment of FIG. 3, the illustrated double-walled containment cell includes a first alignment joint 28 that aligns the base plate 14 with the outer cell base 6, and includes a second alignment joint 28 that aligns the outer cell base 6 with the inner cell base 2. An alignment joint can also be formed between the base plate 14 and an inner cell base 2 during assembly of a cell. For instance, FIG. 4 illustrates a disassembled double-walled containment cell including a base plate 14, inner cell base 2, inner cell cap 4, outer cell base 6, and outer cell cap 8. In FIG. 4, the inner cell base 2 is oriented on the base plate 14 by mating between the extension 26 of the base plate 14 and the recess 24 of the inner cell base 2. This can be a first step in assembly of a double-walled containment cell.

Figure 6:
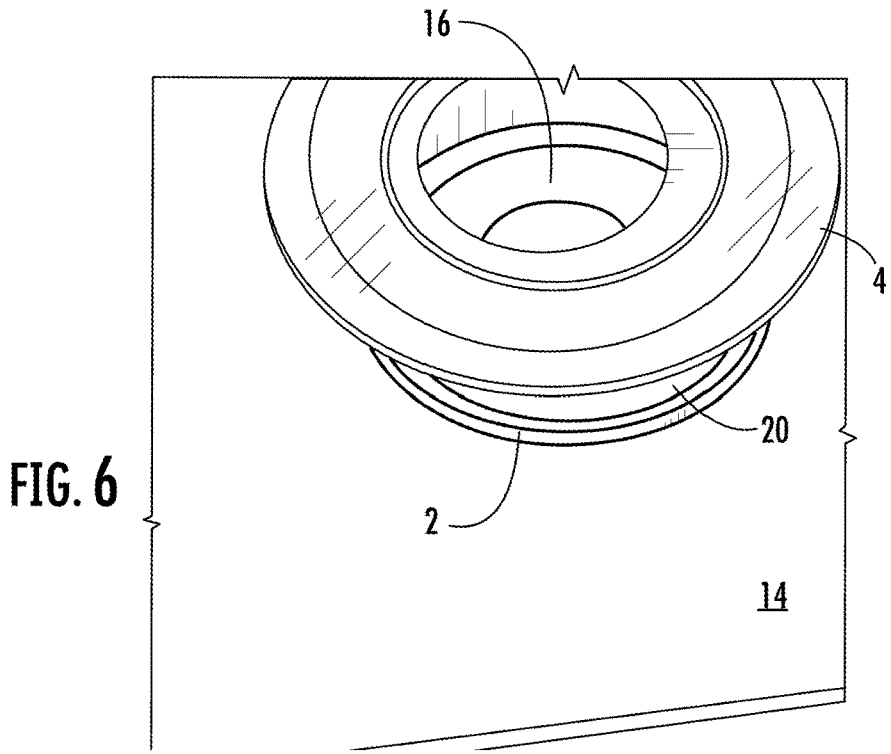
FIG. 6 illustrates assembly of an inner cell of a double-walled containment cell.

FIG. 6-FIG. 12 illustrate an assembly process for a double-walled containment cell. Following placement of an inner cell base 2 on a base plate 14 at an alignment joint (not shown in FIG. 6), a sample for examination (not shown in the figures) can be placed on a sample holder of the inner cell base 2. Following, an inner cell cap 4 can be attached to the inner cell base 2, as shown in FIG. 6. FIG. 6 also shows the presence of an O-ring 20 that will improve the seal between the inner cell base 2 and the inner cell cap 4. The alignment joint between the base plate 14 and the inner cell base 2 can prevent motion of the base 2 as the inner cell cap 4 is attached thereto. Upon this attachment, a sample can be sealed within the sample chamber of the inner cell and can be optically accessible through the inner cell window 16.

Figure 7:
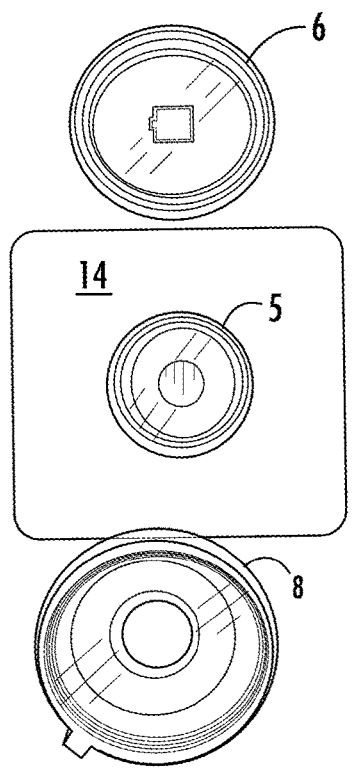
FIG. 7 illustrates a partially assembled double-walled containment cell.
Figure 8:
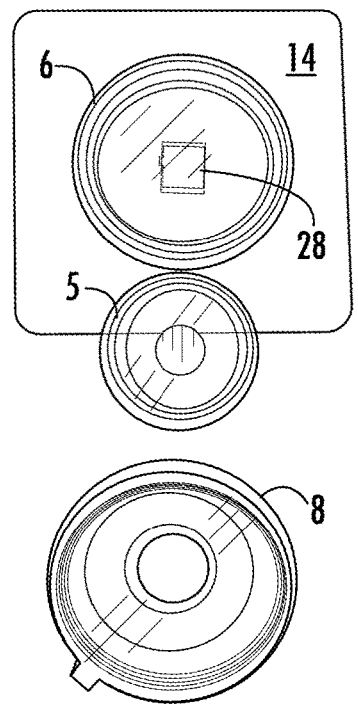
FIG. 8 illustrates initial assembly of an outer cell of a double-walled containment cell.
Figure 9:
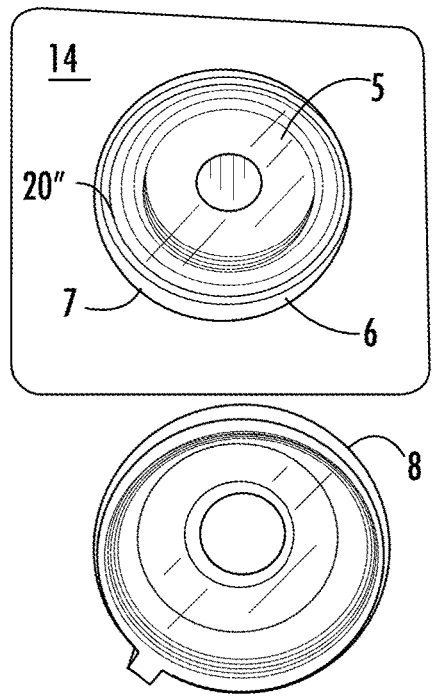
FIG. 9 illustrates assembly of an outer cell of a double-walled containment cell.
Figure 10:
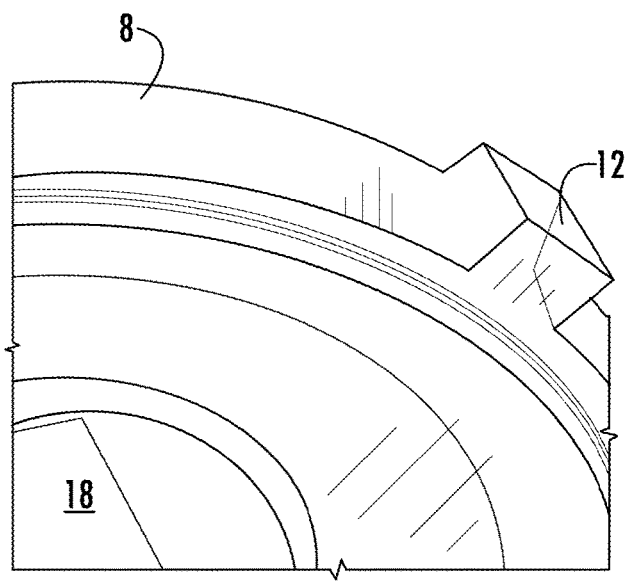
FIG. 10 illustrates an alignment mechanism on an outer cell cap of a double-walled containment cell.

FIG. 7 illustrates the assembled inner cell 5 retained on the base plate 14 with an alignment joint 28 (not shown in FIG. 7). The inner cell 5 can then be removed from the base plate 14 and the outer cell base 6 aligned on the base plate 14 via an alignment joint 28 between the two (FIG. 8). The assembled inner cell 5 is then placed in the outer cell base 6, where it can nest within the lip 7 of the outer cell base 6, as described previously (FIG. 9). O-ring 20" for improving a seal between the outer cell base 6 and the outer cell cap 8 is also visible in FIG. 9. FIG. 10 illustrates a portion of the outer cell cap 8 including the orientation mechanism 12 and a portion of the outer cell window 18.

The final step of a containment cell assembly process includes attachment of the outer cell cap 8 to the outer cell base via the threaded mated surfaces of the outer cell base 6 and the outer cell cap 8. As with the inner cell assembly, the alignment joint 28 formed between the outer cell base 6 and the base plate 14 can facilitate attachment of the outer cell cap 8 and prevent rotation or other motion of the outer cell base 6. This can be particularly advantageous when assembling the double-walled containment cell in a glove box or other difficult-to-manipulate area.

Figure 11:
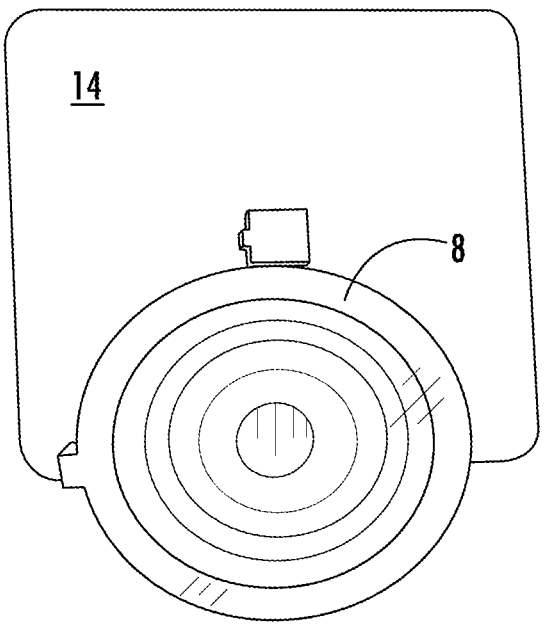
FIG. 11 presents a top view of a fully assembled double-walled containment cell.
Figure 12:
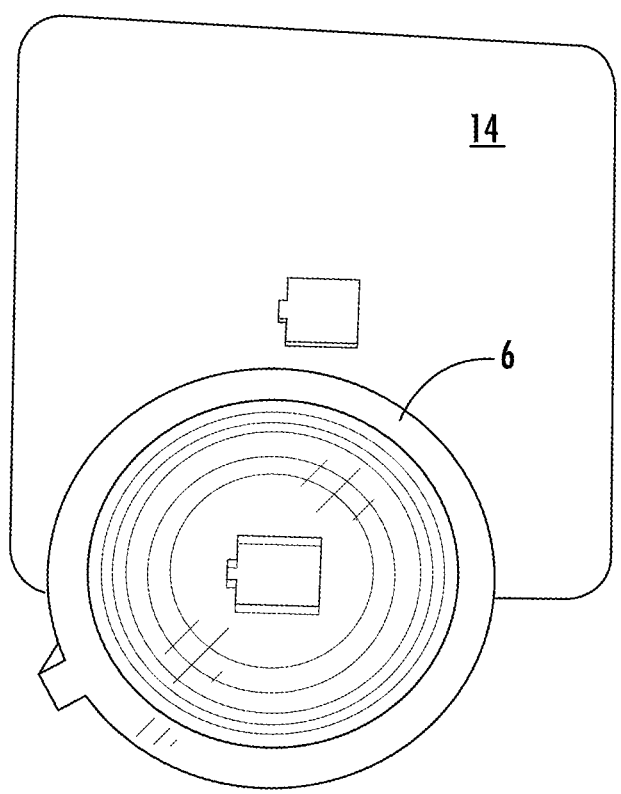
FIG. 12 presents a bottom view of a fully assembled double-walled containment cell.

FIG. 11 and FIG. 12 illustrate the assembled double-walled containment cell in a top view (FIG. 11) and a bottom view (FIG. 12).

Figure 13:
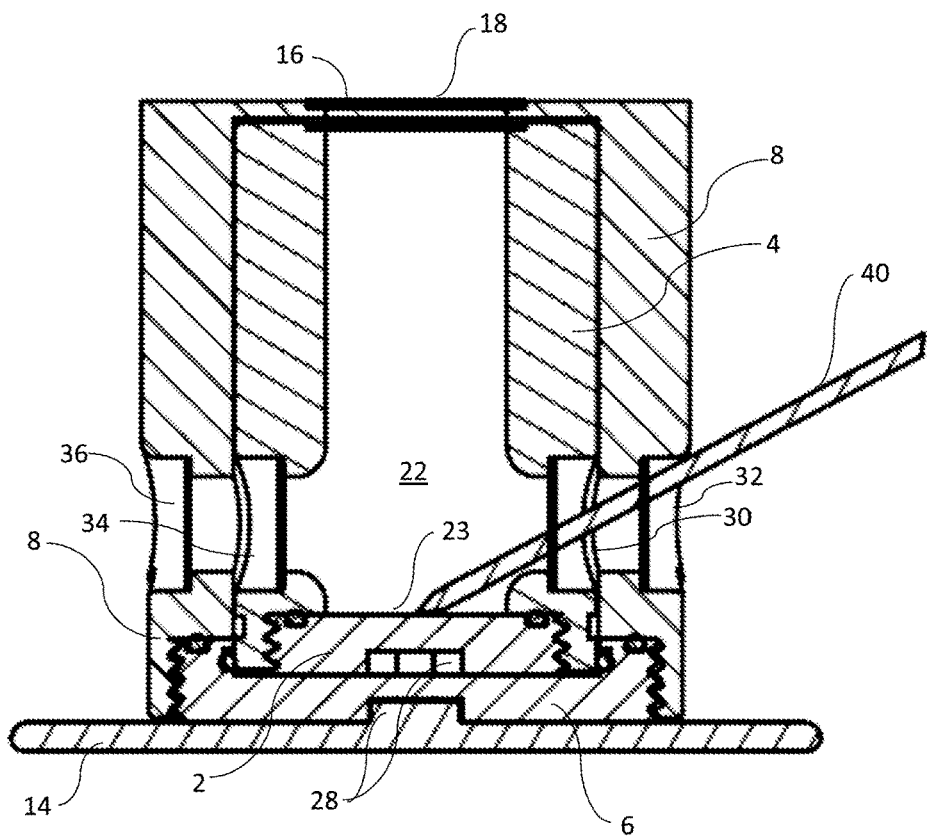
FIG. 13 presents a sectional view of another embodiment of a double-walled containment cell.

FIG. 13 illustrates another embodiment of a double-walled containment cell. In this embodiment, the base plate 14, inner cell base 2, and outer cell base 6 can be much the same as in the embodiment illustrated in FIG. 3. The inner cell cap 4 and the outer cell cap 8, however, vary from the embodiment of FIG. 3 to include additional windows. As illustrated, the inner cell cap 4 includes, in addition to window 16 at the top of the sample chamber 22, window 30 and window 34 that are aligned with each other as well as with the sample chamber 22 so as to allow for transmission through the sample chamber 22. Likewise, the outer cell cap 8, in addition to window 18 at the top of the cap 8, include window 32 and window 36 that are aligned with each other and, upon assembly, can be aligned with windows 30 and 34 of the inner cell cap 4 and with the sample chamber 22, which can allow for transmission through the sample chamber 22.

The addition of the transmissive windows on either side of a sample chamber 22 can provide for additional analysis techniques. For instance, in the illustrated embodiment, a laser 40 can be transmitted through windows 30, 32 to contact a sample retained on a sample holder 23, for instance, in a laser ablation analysis technique. The results of an interaction between a laser 40 and a sample can be obtained via a detector in optical communication with the sample holder via windows 34 and 36.

Of course, a transmission-based analysis technique for use with a containment cell as illustrated in FIG. 13 is not limited to a laser ablation technique, and other analysis techniques can likewise be carried out by use of the cell. The inclusion of the windows 16, 18 in the cell can provide for additional analysis techniques to also be carried out, e.g., back scatter type techniques. The windows of a cell can be formed of the same or different materials from one another and can be designed with particular analysis techniques in mind. For instance, windows 30, 32, 34, and 36, may be formed for a laser transmission-based analysis, e.g., sapphire or sapphire coated quartz, and windows 16, 18 can be formed for a spectroscopy analysis, e.g., quartz.

Figure 14:
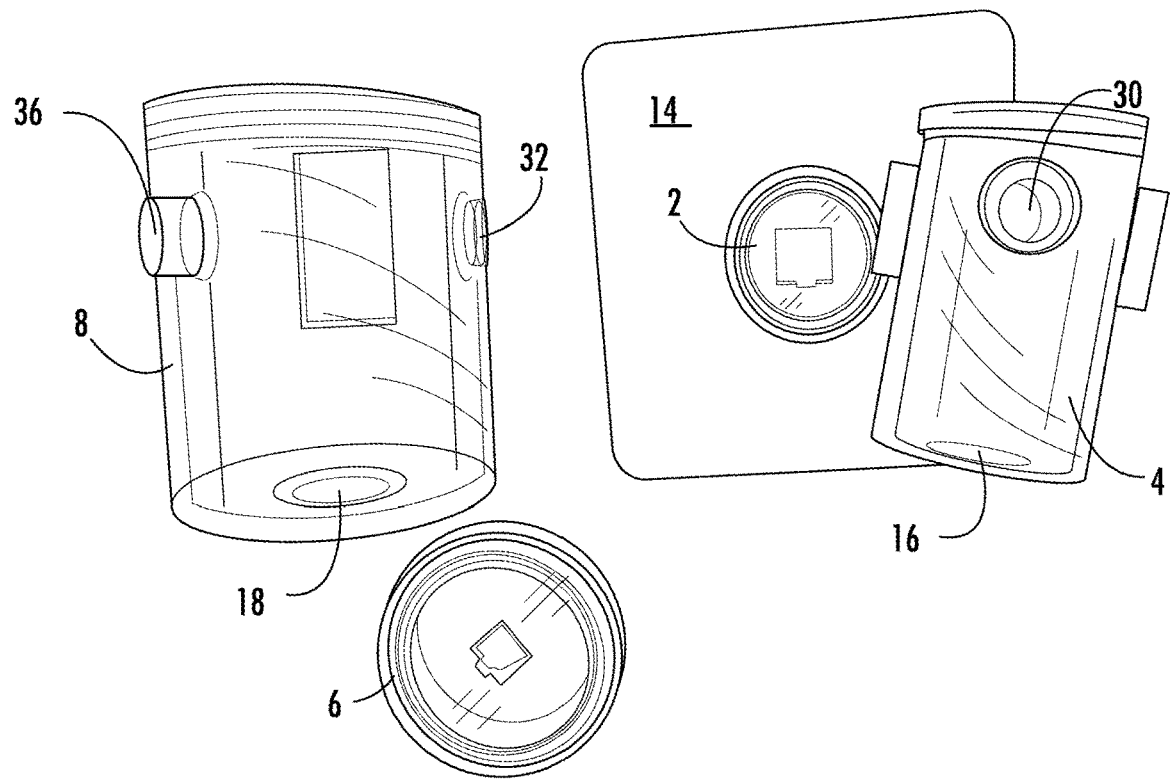
FIG. 14 illustrates a disassembled double-walled containment cell.
Figure 15:
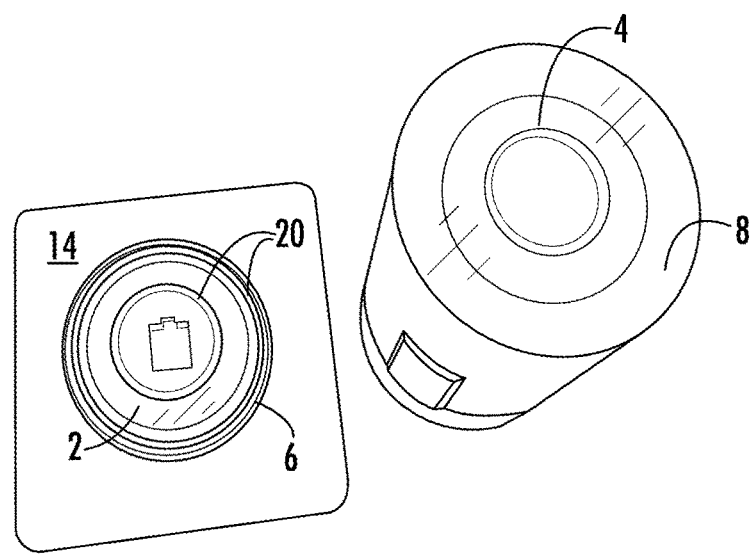
FIG. 15 illustrates a partially assembled double-walled containment cell.
Figure 16:
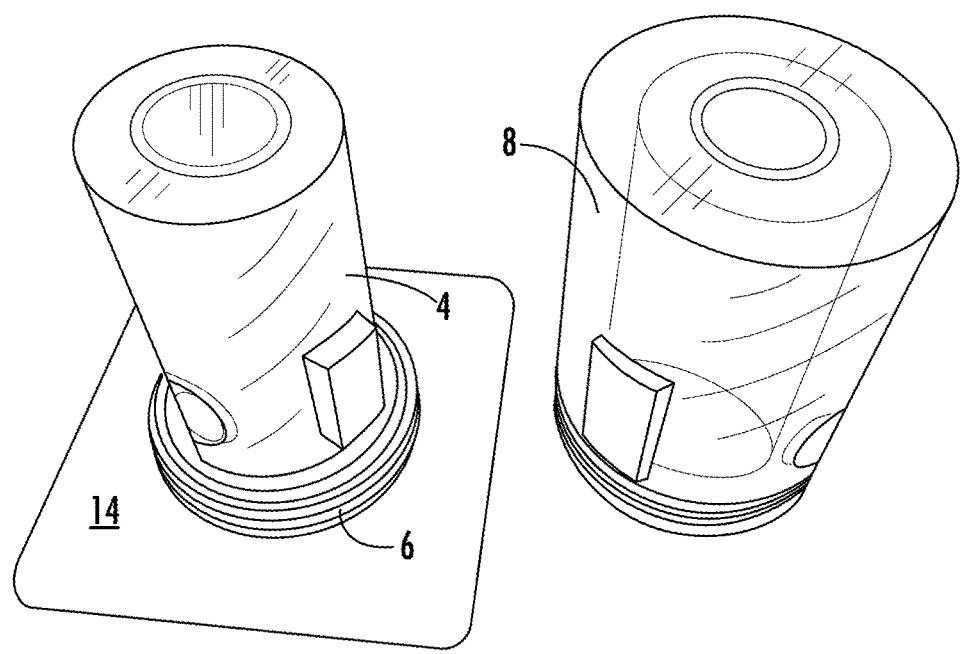
FIG. 16 illustrates a partially assembled double-walled containment cell.

A double-walled containment cell as illustrated in FIG. 13 is shown disassembled in FIG. 14 including the base plate 14, inner cell base 2, inner cell cap 4, outer cell base 6, and outer cell cap 8. Windows 16, 18, 30, 32, and 36 can also be seen in FIG. 14. FIG. 15 and FIG. 16 illustrate the containment cell of FIG. 14 partially assembled, with FIG. 15 showing the inner cell base 2 nested within the outer cell base 6, which is also aligned on the base plate 14 via an alignment joint (not shown in the figure). The inner cell cap 4 is nested under the outer cell cap 8 in FIG. 15. O-rings 20 for improved seal are also visible in FIG. 15. FIG. 16 shows further steps of the assembly following attachment of the inner cell cap 4 to the inner cell base and prior to the attachment of the outer cell cap 8 to the outer cell base 6.

Figure 17:
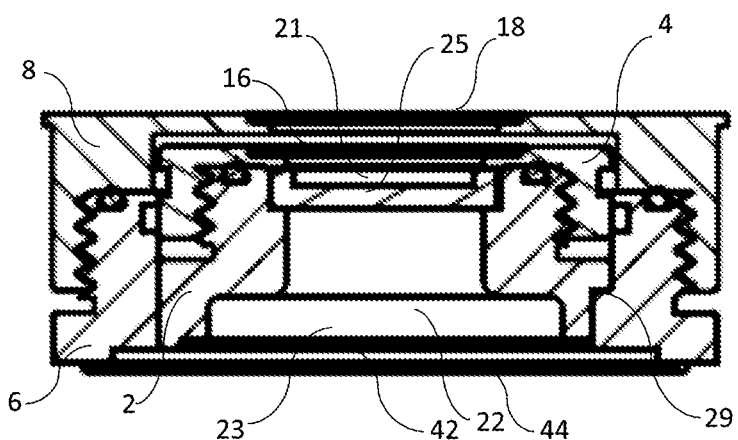
FIG. 17 presents a sectional view of another embodiment of a double-walled containment cell.
Figure 18:
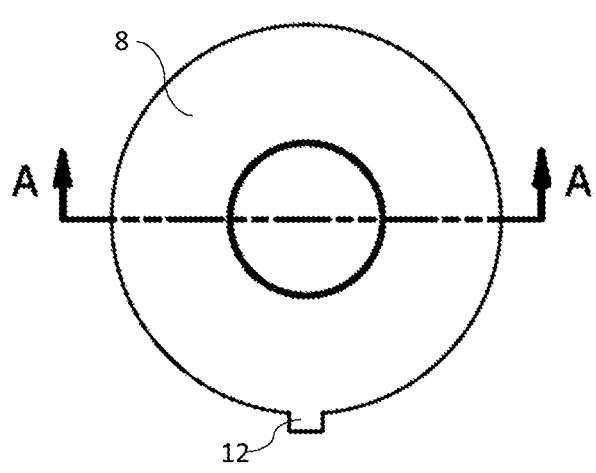
FIG. 18 presents a top view of the double-walled containment cell of FIG. 17.
Figure 19:
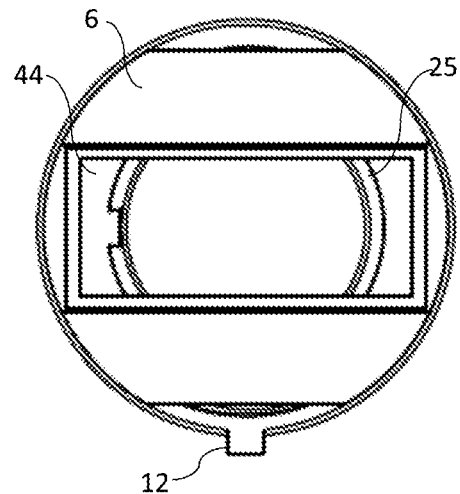
FIG. 19 presents a bottom view of the double-walled containment cell of FIG. 17.

FIG. 17 illustrates yet another embodiment of a double-walled containment cell encompassed herein. As illustrated, in this embodiment, the containment cell can include window 16 in the inner cell cap 4 and aligned window 18 in the outer cell cap 8, and can also include window 42 in the inner cell base 2 and aligned window 44 in the outer cell base 6. As indicated, windows 42, 44, 16, and 18 can all be aligned with one another and with a sample holder 23 and sample chamber 22, for instance, for a transmission-based analysis technique. For example, windows 42 and 44 can be designed for transmission of X-rays (e.g., beryllium windows) and the cell can be utilized in an X-ray diffraction analysis of a sample retained on the sample holder 23 in the sample chamber 22. Windows 16, 18 can be formed of a different material, e.g., barium fluoride, for detection of the interaction of X-rays with a sample and/or other analysis techniques. FIG. 18 presents a top view of the embodiment of FIG. 17, with FIG. 17 providing the sectional view along section line A-A of FIG. 18, and FIG. 19 provides a bottom view of the embodiment of FIG. 17.

Due to the presence of the windows in the inner cell and outer cell bases, the bases in this embodiment can include an alignment joint in a location other than centered in the cell bases. For instance, a double-walled containment cell can include an alignment joint 29 that can align the position of the inner cell base 2 with the outer cell base 6 and this alignment joint can be located on a side of the system. An alignment joint 29 can include a detent or the like that upon latching, can prevent motion between the two bases until released, e.g., by use of a push-button catch or the like.

A double-walled containment cell can include multiple sample chambers. For instance, in the embodiment of FIG. 17, in addition to sample chamber 22 and sample holder 23 on the bottom of the inner cell base 2, the cell can include an additional sample holder 25 that can retain an additional sample in a sample chamber 21 closer to the upper windows 16, 18 of the cell. A second sample chamber can be utilized to ensure the sample is locatable at a desired working distance for all analysis techniques that may be carried out. For instance, in the illustrated embodiment, a first amount of a sample can be retained on sample holder 23. The location of this sample can be designed for a transmission-based analysis technique, such as X-ray diffraction. This location may not be ideal, however, for other analysis techniques, such as a microscopy or spectroscopy examination, as the sample could be outside of the desired working distance for the examination, e.g., about 7 mm or greater. As such, a cell can include additional sample holders. For instance, in the illustrated embodiment, the containment cell includes a second sample holder 25 that retains an additional sample in a second sample chamber 21. This sample can be located with a working distance designed for other analysis techniques.

Disclosed double-walled containment cells can be easily assembled, even in a constrained area such as a glove box, without the need for assembly tools, and can seal a sample within the cell for safe storage, transport, and analysis by a variety of different analysis approaches. Moreover, the double-walled containment cell can be of a size that is easily transported and examined, for instance, with a maximum external dimension of about 10 inches or less, or about 5 inches or less in some embodiments. The cells can thus provide a route for improved analysis of any type of sample, including radioactive samples and potential biohazards.

While certain embodiments of the disclosed subject matter have been described using specific terms, such description is for illustrative purposes only, and it is to be understood that changes and variations may be made without departing from the spirit or scope of the subject matter.

What is claimed is:

1. A double-walled containment cell comprising:
    an inner cell, the inner cell including an inner cell base and an inner cell cap that are removably attachable to one another, the inner cell base comprising a sample holder and an outer surface, the inner cell cap including an inner surface that is configured to mate with the outer surface of the inner cell base, the inner cell cap further including a first window that is transmissive to an electromagnetic wavelength;
    an outer cell, the outer cell including an outer cell base and an outer cell cap that are removably attachable to one another, the outer cell base including an inner surface that is configured to mate with an outer surface of the inner cell cap, the outer cell base including a first outer surface and a second outer surface that define a lip, the outer cell cap including a first inner surface and a second inner surface that are configured to mate with the first and second outer surfaces of the outer cell base, the outer cell cap further including a second window that is transmissive to the electromagnetic wavelength;
    wherein
    upon assembly of the inner cell with the outer cell, a sample chamber is defined that is sealed from a surrounding environment with a gas-tight seal and further wherein the sample chamber, the first window, and the second window are in optical alignment with one another.

2. The double-walled containment cell of claim 1, further comprising an alignment joint between the outer cell base and the inner cell base.

3. The double-walled containment cell of claim 1, further comprising a base plate, wherein the base plate is configured to form an alignment joint with the outer cell base.

4. The double-walled containment cell of claim 3, wherein the base plate can optionally form an alignment joint with the inner cell base.

5. The double-walled containment cell of claim 1, the outer cell further comprising an external orientation mechanism.

6. The double-walled containment cell of claim 1, wherein upon assembly alpha radiation is blocked from emission between the sample chamber and the surrounding environment.

7. The double-walled containment cell of claim 1, wherein the inner surface of the inner cell cap and the outer surface of the inner cell base are threaded for mating to one another.

8. The double walled-containment cell of claim 1, wherein the first outer surface of the outer cell base and the first inner surface of the outer cell cap are threaded for mating to one another.

9. The double-walled containment cell of claim 1, further comprising one or more O-rings.

10. The double-walled containment cell of claim 1, further comprising a third window in the inner cell and a fourth window in the outer cell, wherein upon assembly of the inner cell with the outer cell, the third window, the fourth window, and the sample chamber are in optical alignment with one another.

11. The double-walled containment cell of claim 10, further comprising a fifth window in the inner cell and a sixth window in the outer cell, wherein upon assembly of the inner cell with the outer cell, the fifth window and the sixth window are in optical alignment with one another and with the third window, the fourth window, and the sample chamber.

12. The double-walled containment cell of claim 10, wherein the third window and the fourth window are transmissive to X-rays and the electromagnetic wavelength is from about 320 nm to about 2500 nm.

13. A method for examining a sample comprising:
locating a sample on a sample holder of an inner cell base;
attaching an inner cell cap to the inner cell base to form an inner cell, the inner cell cap comprising a first window;
locating the inner cell in an outer cell base;
attaching an outer cell cap to the outer cell base to complete assembly of a double-walled containment cell, the outer cell cap comprising a second window; wherein
upon completion of the assembly, the sample is sealed within a sample chamber of the double-walled containment cell with a gas-tight seal, and the sample holder, the first window, and the second window are in optical alignment with one another; and
examining the sample sealed in the sample chamber according to a first optical analysis technique.

14. The method of claim 13, further comprising examining the sample according to a second optical analysis technique.

15. The method of claim 13, the optical analysis technique comprising laser ablation, X-ray diffraction, laser ablation, spectral analysis, or imaging analysis.

16. The method of claim 15, the spectral analysis comprising Raman spectroscopy, infrared spectroscopy, or laser induced breakdown spectroscopy.

17. The method of claim 13, further comprising retaining the inner cell base on a base plate by use of an alignment joint as the inner cell cap is attached to the inner cell base.

18. The method of claim 17, further comprising retaining the outer cell base on the base plate by use of the alignment joint as the inner cell is located in the outer cell base and as the outer cell cap is attached to the outer cell base.

19. The method of claim 13, wherein the assembly is carried out in a glove box.

20. The method of claim 13, further comprising transporting and/or storing the assembled double-walled containment cell prior to the examination of the sample.

* * * * *